Oct. 24, 1944.  S. AXELROD  2,360,824
PEDAL OPERATED VEHICLE
Filed Dec. 18, 1941
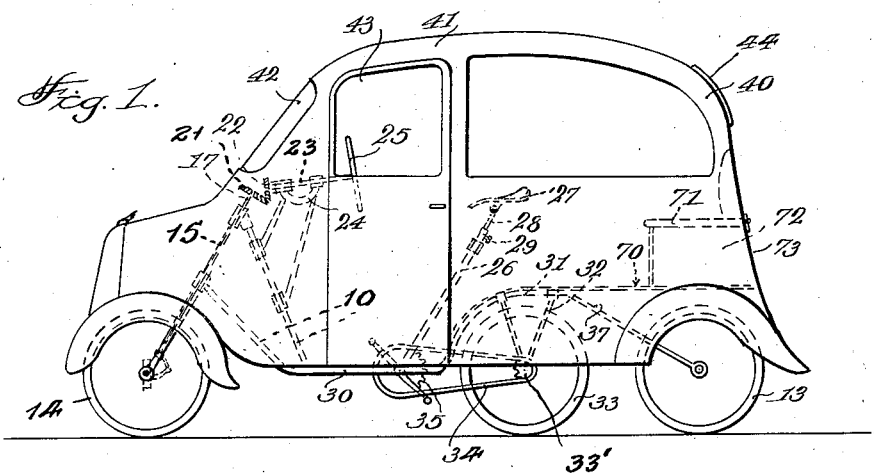
Inventor
Solomon Axelrod
By Christian R. Nielsen
Attorney Patented Oct. 24, 1944

2,360,824

UNITED STATES PATENT OFFICE 2,360,824

PEDAL OPERATED VEHICLE

Solomon Axelrod, New York, N. Y.

Application December 18, 1941, Serial No. 423,549

1 Claim. (Cl. 280—231)

The invention has for an object to effect improvements in velocipedes and the like, to the end of increasing the comfort and safety of the occupants, protecting the riders from the weather, wind, and rain, and also protecting the riders from injury in case of collision, this being an important factor in present-day operation of vehicles propelled by foot-power, the use of bicycles being exceedingly dangerous, and resulting in numerous accidents with injury to the occupants.

A further important aim of the invention is to provide a novel construction of a pedal-driven vehicle adapted to be operated by two persons, or one person alternatively, where two persons may sit side by side and operate pedals of the device, to the end that when one person operates the vehicle the center of gravity may be maintained centrally of the vehicle, and the centrally located operator may operate pedals of the machine as a result of a novel construction embodying the invention.

A further object of the invention is to enable the carrying of passengers in such vehicles, whether operated by one or two persons, in a novel arrangement and construction of the means therefor.

A further aim is to give a vehicle of high stability, yet involving an extremely simple drive.

Additional objects, advantages and features of invention reside in the specific construction, arrangement, and combination of parts involved in the embodiment of the invention, as will be understood from the accompanying description and drawing, wherein Figure 1 is a side elevation of a vehicle constructed in accordance with my invention.

Figure 2 is a top view thereof.

Figure 3 is a top view of the running gear.

There is illustrated a pedal-operated vehicle or velocipede comprising a wheeled frame 10, the frame proper being mounted upon a front axle 11, and having a rear axle 12 upon the ends of which respective idler wheels 13 are mounted, the axle 12 constituting a part of the frame 10. At each end of the front axle 11, respective steering wheels 14 are mounted, in a conventional way. The frame 10 includes a head 15, in which the stem of a steering fork 16 is mounted, which is extended downwardly and fixed at its extremities to the axle 11. Within the head and stem of the fork a steering shaft 17 is revolubly mounted, carrying a steering arm 18 at its lower extremity which is pivoted upon the cross rods 19, the ends of which are pivoted upon knuckle arms 20 of the wheel mountings of the wheel 14. The upper end of the shaft 17 carries a bevelled gear 21, driven by a similar gear 22 carried at the forward end of a steering shaft 23 mounted in a suitable bracketing 24 of the frame 10, and having a steering wheel 25 fixed on its rear end in a conventional position. The frame includes a saddle post 26 which may be constructed to carry one, two or more seats, 27, and in such case the seat structures may have a stem portion 28 slidable in the post 26 and secured by a set screw 29, in a conventional way. This will permit removal of a single seat structure and the substitution of a double seat or a triple seat device. In the event of the employment of a triple seat device, one seat will be located in the central vertical plane of the vehicle, while the two others will be located a spaced distance from each side of the first.

The forward part of the frame is constructed with a low pedal-carrying bar 30, stopping at the rear adjacent a vertical line from the seat 27, the frame being continued therefrom with an upwardly offset rear member 31 which extends horizontally a short distance immediately to the rear of the seat 27, and has fixed thereon two lateral downwardly extending guide wheel brackets 32, between which a drive wheel 33 is revolubly mounted, this having a sprocket 33' fixed on its hub from which a chain 34 is extended forwardly to a drive sprocket 35 mounted upon a crank shaft 36 which is revolubly mounted in a conventional way upon the bottom bar 30 of the frame. If desired, the wheel 33 may have a sprocket on each side, and a second chain 34' may be extended forwardly to a sprocket 35' also mounted on the shaft 36 concentrically with the sprocket 35.

Rearwardly of the drive wheel 33 the frame is continued rearwardly and downwardly as a single tube member 37, its extremity being united with the rear axle 12.

A housing 40 is provided, for enclosing the seat and steering device, and in addition providing a space at the rear of the seat 27, this housing being of any conventional production form, being adapted to be mounted upon the axles 11 and 12, to which they may be secured in any conventional way.

The body is formed with a roof portion 41, a front windshield 42, at least one lateral entrance door 43, a rear side window 44, with such additional windows as may be dictated by requirements of use.

The crank shaft 36 is formed with a central heavy horizontal shaft portion proper mounted in usual bearings at 45 on the bottom bar 30 of the frame, and at respective ends this shaft is provided with crank arms 46 and 47 one of which may be detachably secured on the heavy shaft portion. At the ends of the crank arms 46 and 47 respective pedal shafts 48 and 49 are provided, conventionally shown in the present instance, and adapted to receive any usual pedal thereon, not shown. The extremities of the pedal shafts 48 and 49 have mounted thereon respective supplementary removable crank devices 50, each one consisting of a main rectilinear arm 51 constructed so as to be secured to the extremity of one pedal shaft, and of such length that when secured upon the last mentioned shaft extending parallel to the respective crank arms 46—47, the arms 51 will extend across the axis of the crank shaft and beyond a distance corresponding to the radius of the pedal shafts 48 and 49, and at this part each arm 51 has mounted on its end or formed integrally therewith, a pedal shaft 52. From the outer end of each pedal shaft, a mounting arm 53 is extended inwardly parallel to the respective adjacent crank arms 51, and at the extremity of the arms 53, located on the axis of the shaft 36, a lateral shaft extension 54 is formed, adapted to be mounted in a bearing 55 which may be provided on the body 40. For this purpose, the body 40 is indicated as formed of sheet metal, and at its lower part on each side, a flange 56 is formed consisting of metal inturned from the side portions, this flange 56 extending longitudinally of the body, the bearing 55 consisting of a strap form mounted upon the flange 56.

In the use of the device, the occupants may gain access through a door 43 at one or either side of the machine, and in the case of a single operator, he takes his seat upon the central seat 27, placing the right foot upon the pedal shaft 48 and the left foot upon the pedal shaft 49, and driving the vehicle by means thereof in the familiar way. Any usual brake appliances may be incorporated, these not being shown, and other customary or essential accessories incorporated as required.

In the event that two persons are to operate the machine, they enter the vehicle in the same way, and take their places upon the lateral seats 27', the person upon the right placing his left foot upon the pedal shaft 48, and his right foot upon the pedal shaft portion 52 of the adjacent crank device 50.

The person at the left of the vehicle places his right foot upon the pedal shaft 49, and his left foot upon the pedal shaft 42 of the auxiliary crank device 50, and the two persons may then pedal the machine in the conventional way, for its propulsion.

In the event that two persons operate the machine, hand grips 57 may be provided upon the body 40 for one or both occupants, so that either may then operate the vehicle by manipulation of the steering wheel 25. If desired, the steering shaft 23 may include a universal joint.

Within the vehicle at the rear part, there is provided a lower platform 70, located a distance below the seats, and a seat 71 is provided above this platform at the extreme rear of the vehicle. Under the seat a compartment 72 is thus provided, to which access may be gained by a rear compartment door 73 in the rear side of the body.

The body is preferably constructed so as to rest directly upon the axles 11 and 12, suitable rests 74 being provided for this purpose, and any usual construction of the body 40 for attachment to these rests may be incorporated, these details not constituting a novel part of my invention and therefore not being illustrated. In consequence, the body rests upon the running gear independently of the frame, which is thus required only to carry the weight of the passengers on the seats 27 or 27' as the case may be, the platform 70 and seat 71 being independently supported upon the sides of the body 40. As a result, the weight of any third person or other load upon the platform and seat 71 are sustained by the wheels 13, which in addition afford a stabilizing effect, minimizing the liability of upset of the vehicle, yet retaining all the advantages of a single wheel drive, by which the elimination of complications in transmission of power to the traction wheel is reduced to its simplest form.

While I have disclosed with great particularity a specific construction of my invention in the best form in which I have thus far perfected it, it will, nevertheless, be understood that this is purely exemplary, and various modifications in the construction, arrangement and combination of parts, substitutions of materials and substitution of mechanical equivalents may be made without departing from the spirit of the invention, as more particularly defined by the appended claim, wherein, I claim:

A manually propelled vehicle of the character described consisting of a frame having a driving wheel located substantially medially of the frame, a steering wheel, and a pair of laterally spaced idler wheels rearwardly of the driving wheel, a body enclosing said frame, means to operate the vehicle consisting of a crank shaft having a body axle portion mounted transversely on the frame and having respective pedal shafts thereon offset from the crank shaft on radii spaced 180 degrees, an arm extended at right angles from each of said pedal shafts across the axis of the crank shaft and beyond, and carrying respective pedal shafts thereon, a multiple seat support carried by the frame including a central mounting in the longitudinal axis of the frame, and two lateral mountings centered with respect to respective first named pedal shafts and the second named pedal shaft, the last named pedal shafts each having a mounting arm parallel to its respective first named arm and a lateral shaft portion coaxial with the first named shaft, and a bearing support upon opposite sides of the body for revolubly mounting respective lateral shaft portions.

SOLOMON AXELROD.